(12) United States Patent
Wada

(10) Patent No.: US 11,478,342 B2
(45) Date of Patent: Oct. 25, 2022

(54) ELECTRIC TOOTHBRUSH

(71) Applicant: SUNSTAR INC., Takatsuki (JP)

(72) Inventor: Yukinori Wada, Takatsuki (JP)

(73) Assignee: SUNSTAR INC., Takatsuki (JP)

( * ) Notice: Subject to any disclaimer, the term of this patent is extended or adjusted under 35 U.S.C. 154(b) by 253 days.

(21) Appl. No.: 16/607,078

(22) PCT Filed: Apr. 24, 2018

(86) PCT No.: PCT/JP2018/016585
§ 371 (c)(1),
(2) Date: Oct. 21, 2019

(87) PCT Pub. No.: WO2018/199081
PCT Pub. Date: Nov. 1, 2018

(65) Prior Publication Data
US 2020/0078152 A1    Mar. 12, 2020

(30) Foreign Application Priority Data

Apr. 24, 2017 (JP) .............................. JP2017-085574

(51) Int. Cl.
*A61C 17/34* (2006.01)
*A61C 17/22* (2006.01)

(52) U.S. Cl.
CPC ........ *A61C 17/3436* (2013.01); *A61C 17/222* (2013.01); *A61C 17/225* (2013.01)

(58) Field of Classification Search
CPC ... A61C 17/34; A61C 17/3436; A61C 17/222; A61C 17/225; A61C 17/22
See application file for complete search history.

(56) References Cited

U.S. PATENT DOCUMENTS

2004/0168271 A1   9/2004  McDougall
2016/0317007 A1  11/2016  Addington

FOREIGN PATENT DOCUMENTS

| JP | 2005-027762 A | 2/2005 | |
|---|---|---|---|
| JP | 2005-160498 A | 6/2005 | |
| JP | 2006-55194 A | 3/2006 | |
| JP | 3957576 B2 | 8/2007 | |
| JP | 2008-29659 A | 2/2008 | |
| JP | 2008-29856 A | 2/2008 | |
| WO | WO-9107116 A1 * | 5/1991 | ......... A61C 17/3436 |

OTHER PUBLICATIONS

International Search Report for International Application No. PCT/JP2018/016585 dated Jul. 3, 2018 (4 sheets, 2 sheets translation, 6 sheets total).

* cited by examiner

*Primary Examiner* — Shay Karls
(74) *Attorney, Agent, or Firm* — Kratz, Quintos & Hanson, LLP

(57) ABSTRACT

A brush head is provided on the front surface at a distal-end-side part of a neck of a replaceable brush. A fitting shaft portion is provided on a planting base of the brush head so as to protrude rearward and penetrate through a support wall portion of the neck. A shaft hole is formed at a rotation center of a brush head body of the brush head so as to extend frontward from a rear surface of the brush head body. The neck has ahead support shaft mounted to the shaft hole so as to rotatably support the brush head. A front end of the head support shaft is located frontward of a rear surface of the planting base, and power from the driving portion is transmitted to a rear part of the fitting shaft portion.

11 Claims, 12 Drawing Sheets

Fig.6A
Fig.6B
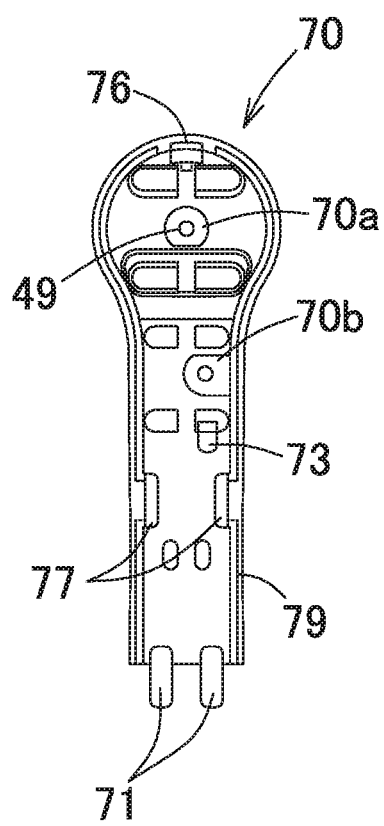
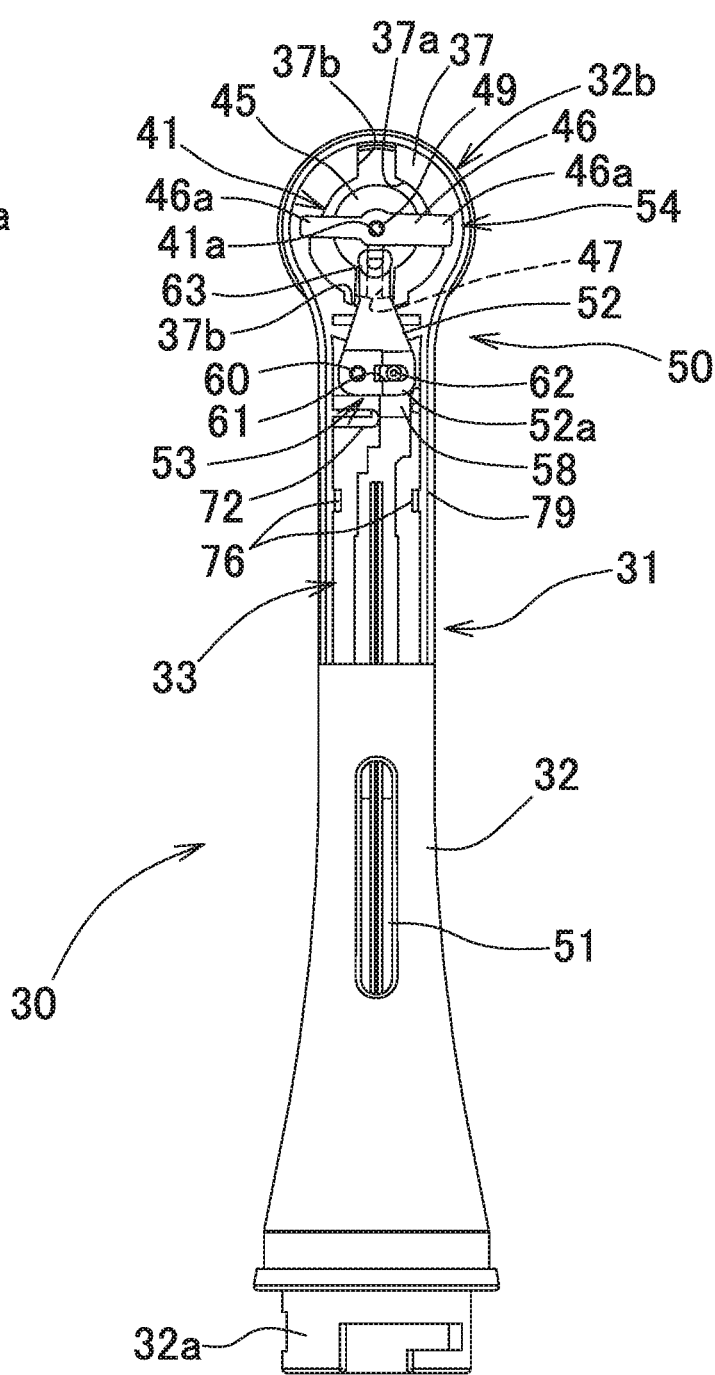

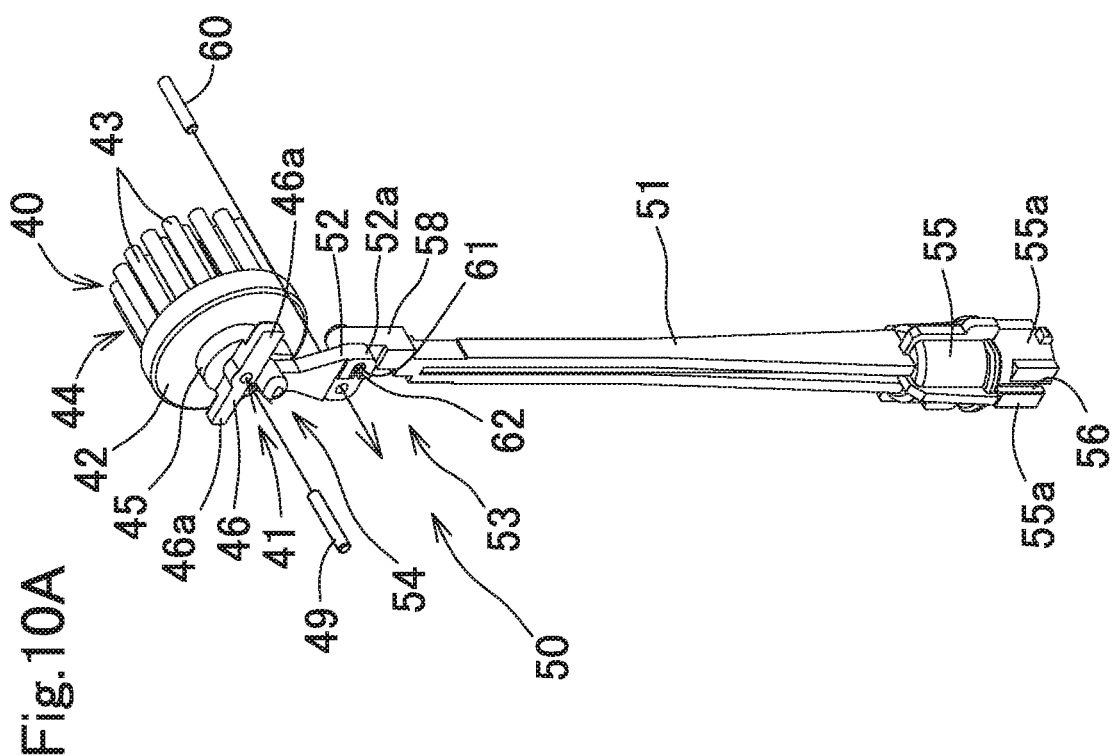

ELECTRIC TOOTHBRUSH

TECHNICAL FIELD

The present invention relates to an electric toothbrush configured so that a brush head rotationally reciprocates.

BACKGROUND ART

As electric toothbrushes, a slide-type electric toothbrush including a brush head that linearly reciprocates, and a rotation-type electric toothbrush including a brush head that rotationally reciprocates, have been widely put into practical use.

As the rotation-type electric toothbrush, an electric toothbrush having a head-side conversion portion for converting a reciprocating linear motion of an output shaft to a reciprocating rotational motion of a brush head (see, for example, Patent Literature 1) is widely used.

In the electric toothbrush described in Patent Literature 1, in order to rotatably support a brush head at a distal end of a neck of a replaceable brush, a head support shaft that rotatably supports the brush head is provided at the vicinity of an upper part of the neck so as to protrude frontward. A rotation shaft is provided at the rear surface of a planting base so as to protrude rearward. A pair of crank arms which also serve to prevent the brush head from coming off are provided at a rear end of the rotation shaft. A support wall portion is formed at the distal end of the neck on the rear surface side of the planting base. The support wall portion is provided with a through hole through which the rotation shaft of the brush head is inserted, and cutouts through which the crank arms are inserted. The support wall portion blocks frontward movement of the crank arms, to prevent the brush head from coming off. As a head-side conversion portion, a recess is formed in one of the crank arms, a bent portion at a distal end of a joint is fitted to the recess so as to be connected thereto, and a base end of the joint is tiltably connected to a distal end of a connection bar. The connection bar is allowed to linearly reciprocate linear by an output shaft of a driving portion, so that the brush head can perform a reciprocating rotational motion via the joint.

Patent Literature 2 describes an electric toothbrush in which no planting holes are formed at the rotation center of the planting base, and a front end of a head support shaft is located frontward of a rear end of bristle bundles, whereby a brush head is downsized in the front-rear direction.

CITATION LIST

Patent Literature

[PTL 1] Japanese Patent No. 3957576
[PTL 2] Japanese Unexamined Patent Application Publication No. 2005-027762

SUMMARY OF THE INVENTION

Problems to be Solved by the Invention

In order to reduce looseness of the brush head, the head support shaft that rotatably supports the brush head needs to be fitted to the brush head at least by a certain length. In the electric toothbrush described in Patent Literature 1, the front end of the head support shaft is located rearward of the rear surface of the planting base. Accordingly, the thickness in the front-rear direction of the brush head is inevitably increased, causing the operability, in an oral cavity, of a brush portion formed by planting the bristle bundles into the planting base to deteriorate. As a result, cleaning performance on the back side of molar teeth deteriorates, for example.

In addition, in the electric toothbrush described in Patent Literature 1, if a load acts on an outer peripheral portion of the brush portion or a load acts on the brush portion in a direction crossing the head support shaft, during brushing, the brush head is tilted about the distal end of the head support shaft, so that the crank arm comes into slidable contact with the support wall portion, for example. The frictional resistance at this time increases as the tilt center approaches the sliding surface between the crank arm and the support wall portion. Meanwhile, the more rearward the front end of the head support shaft is located, the greater the front-rear-direction size of the brush head is. Therefore, the front end of the head support shaft cannot be located excessively rearward. Accordingly, the front end of the head support shaft is located rearward of the sliding surface after all, as in the electric toothbrush described in Patent Literature 1, thus causing a problem that the frictional resistance cannot be reduced sufficiently.

In the electric toothbrush described in Patent Literature 1, the pair of crank arms which protrude outward in the radial direction and which also have a coming-off preventing function are provided at the rear surface of the rotation shaft provided to the planting base, and the joint is connected to the rear surface of the crank arm so that power of the driving portion is transmitted. Due to this structure, there is a problem that the size of the head part increases in the front-rear direction by an amount corresponding to the thickness of the joint.

On the other hand, in the electric toothbrush described in Patent Literature 2, the front end of the head support shaft protrudes frontward of the rear end of the bristle bundles. Thus, it is possible to downsize the brush head in the thickness direction while ensuring a sufficient length of the head support shaft.

However, in the electric toothbrush described in Patent Literature 2, as in the electric toothbrush described in Patent Literature 1, a pair of crank arms which protrude outward in the radial direction and which also have a coming-off preventing function are provided at the rear surface of the rotation shaft provided to the planting base, and a driving shaft is connected to the rear surface of the crank arm. Due to this structure, there is a problem that the size of the head part increases in the front-rear direction by an amount corresponding to the thickness of the driving shaft.

In addition, in the electric toothbrushes described in Patent Literature 1 and 2, due to the structure in which power of the driving portion is transmitted to the crank arm, the distance between the distal end of the head support shaft and an acting point of the power from the driving portion onto the brush head is greater by an amount corresponding to the thickness of the crank arm, as compared to the case where power is transmitted to the rotation shaft. Accordingly, when power from the driving portion is converted to a rotational motion of the brush head, the moment about the distal end of the head support shaft is great, and the brush head is readily tilted, so that the distal end of the crank arm vibrates in the front-rear direction or the crank arm vibrates rotationally about the length direction thereof. As a result, stability of action of the brush head is reduced, and the frictional resistance increases due to contact between the crank arm and the support wall portion, leading to increase in power consumption.

An object of the present invention is to provide an electric toothbrush in which a head portion provided at a distal end of a replaceable brush has a reduced size in the front-rear direction to improve the operability of the head portion in an oral cavity, and the frictional resistance between a brush head and a neck body and vibration of the brush head are reduced to improve the stability of action of the brush head, and to reduce the power consumption.

Solution to the Problems

The present invention encompasses the following inventions.

1) An electric toothbrush including:
a driving portion mounted inside a body case;
a replaceable brush extending upward from the body case;
a brush head provided on a front side of a distal end of a neck of the replaceable brush; and
a power transmission portion configured to transmit power from the driving portion to the brush head so that the brush head rotationally reciprocates, wherein
the brush head includes a brush head body that has a planting base provided with a plurality of planting holes, and a fitting shaft portion protruding rearward from the planting base and penetrating through a support wall portion that is formed on a side close to a rear surface of the planting base in the neck,
a shaft hole is formed at a rotation center of the brush head body so as to extend frontward from a rear surface of the brush head body,
the neck is provided with a head support shaft which is fitted to the shaft hole so as to rotatably support the brush head,
the head support shaft has a front end that is located frontward of the rear surface of the planting base, and
the power transmission portion is connected to a rear part of the fitting shaft portion.

As used herein, the term "reciprocating rotational motion" refers to a motion in which the brush head repetitively performs a rotational motion of rotating by a certain angle in a forward direction and then rotating by the same angle in a reverse direction.

In the above electric toothbrush, the head support shaft provided to the neck is mounted to the shaft hole of the brush head so that the brush head is rotatably supported by the head support shaft. The front end of the head support shaft is located frontward of the rear surface of the planting base. Therefore, while the fitting length of the head support shaft with respect to the brush head is sufficiently ensured, the brush head has a reduced size in the front-rear direction, and the head portion provided at the distal end of the replaceable brush has a reduced size in the front-rear direction. Thus, operability of the head portion in an oral cavity can be improved, and, for example, the back side of molar teeth can be adequately cleaned. Depending on the manner in which a brushing load acts on the brush head, the brush head is tilted about the front end of the head support shaft, and the brush head comes into contact with a certain part of the neck body, whereby the load acting on the brush head is partially received. Here, in the present invention, the front end of the head support shaft is located to a further front side as compared to the front end of the head support shaft described in Patent Literature 1. Thus, the contact angle of the brush head with respect to the neck body can be made smaller as compared to the electric toothbrush described in Patent Literature 1, so that the frictional resistance can be reduced accordingly. The power transmission portion is connected to a rear part of the fitting shaft portion. Therefore, as compared to the case where power is transmitted to the crank arm as in Patent Literature 2, the distance between the distal end of the head support shaft and an acting point of power from the driving portion onto the brush head can be shortened. Thus, when the brush head reciprocates rotationally by power from the power transmission portion, a moment acting on the brush head about the distal end of the head support shaft is reduced, so that vibration of the brush head due to the moment can be reduced and stability of action of the brush head can be improved.

2) The electric toothbrush according to the above 1), in which the front end of the head support shaft is located frontward of back ends of the planting holes, and no planting hole is formed at a rotation center of the planting base. With this configuration, while the fitting length of the head support shaft with respect to the brush head can be sufficiently ensured, the brush head can be further downsized in the front-rear direction, and the frictional resistance between the brush head and the neck body when the brush head is slightly tilted about the head support shaft can be reduced.

3) The electric toothbrush according to the above 1) or 2), in which a gap between the planting base and the support wall portion is set to 0.2 mm to 1.0 mm. The gap between the planting base and the support wall portion is preferably set to 0.2 mm or greater so as to prevent frictional-resistance increase due to the contact of the planting base having a larger diameter than the coming-off preventing piece c with the support wall portion, and is preferably set to 1.0 mm or less so that a lip, a tongue, or an oral cavity mucous membrane will not be pinched between the planting base and the support wall portion.

4) The electric toothbrush according to any of the above 1) to 3), in which a thickness of the planting base is set to 2 mm to 4 mm. The thickness of the planting base is preferably set to 2 mm or greater so as to obtain sufficient strength and stiffness, and is preferably set to 4 mm or less so that the thickness of the brush head becomes as small as possible and operability of the brush portion in an oral cavity is improved.

5) The electric toothbrush according to any of the above 1) to 4), in which a distance from a front surface of the planting base to the front end of the head support shaft is set to 0.2 mm to 3.9 mm. The distance from the front surface of the planting base to the front end of the head support shaft is preferably set to 0.2 mm or greater so as to sufficiently ensure the strength of the planting base against penetration of the head support shaft, and is preferably set to 3.9 mm or less so that the thickness of the brush head becomes small and operability of the brush portion in an oral cavity is improved.

6) The electric toothbrush according to any of the above 1) to 5), in which the neck includes a neck body having an opening at a rear part of the neck body in a side close to a distal end of the neck body, and a lid member attached to the neck body so as to close the opening, and the head support shaft is fixed so as to protrude from on the lid member. In this case, the head support shaft previously fixed to the lid member can be attached to the neck body together with the lid member. Therefore, as compared to the case where the head support shaft is alone attached separately, workability in attachment of the head support shaft can be greatly improved.

7) The electric toothbrush according to any of the above 1) to 6), in which the power transmission portion includes a head-side conversion portion configured to convert reciprocating linear motion of an output shaft of the driving portion to reciprocating rotational motion of the brush head. In this case, the reciprocating linear motion of the output shaft of the driving portion is converted to the reciprocating rotational motion of the brush head by the head-side conversion portion, and thus a rotation-type electric toothbrush is obtained. Also, if a replaceable brush not having the head-side conversion portion is attached to the output shaft, the brush head can be caused to perform a reciprocating linear motion. Thus, it is possible to realize an electric toothbrush that can be switched between a rotation type and a slide type by replacement of the replaceable brush.

8) The electric toothbrush according to the above 7), in which the head-side conversion portion includes: a connection bar capable of linearly reciprocating together with the output shaft: a swing lever which is located between the connection bar and the brush head body, and has a base portion on a side close to the connection bar is rotatably supported by the neck; a first conversion portion which converts reciprocating linear motion of the connection bar to reciprocating rotational motion of the swing lever; and a second conversion portion which converts the reciprocating rotational motion of the swing lever to reciprocating rotational motion of the brush head body. In the above configuration, the swing lever that is rotatable relative to the neck is provided between the connection bar and the brush head. Therefore, while the maximum rotation angle of the brush head is sufficiently ensured as in a conventional electric toothbrush, a stroke of a reciprocating linear motion of the connection bar and the output shaft can be reduced. Thus, while the maximum rotation angle of the brush head is sufficiently ensured and the cleaning performance of the electric tooth brush is sufficiently ensured, the stroke of the reciprocating linear motion of the connection bar and the output shaft is reduced, so that kinetic energy for causing the connection bar and the output shaft to perform a reciprocating linear motion can be reduced, and in addition, friction energy between the neck body, and the connection bar and the output shaft, is reduced, so that power consumption of the electric toothbrush can be reduced. It is noted that providing the swing lever requires extra kinetic energy for causing the swing lever to perform a reciprocating rotational motion. However, this kinetic energy is smaller than the amount of decrease in kinetic energy and friction energy due to reduction of a stroke of the connection bar and the output shaft. Therefore, power consumption in the electric toothbrush can be reduced in total.

9) The electric toothbrush according to the above 7) or 8), in which a coming-off preventing piece is provided in a diameter direction of the fitting shaft portion at a rear end thereof, the coming-off preventing piece having both ends protruding outward from the fitting shaft portion so that frontward motion of the coming-off preventing piece is blocked by the support wall portion, thereby preventing the brush head body from coming off, and the head-side conversion portion is connected to a rear part of the fitting shaft portion, in a side close to a base portion of the neck body with respect to the coming-off preventing piece. In this case, by both ends of the coming-off preventing piece coming into contact with the support wall portion from the rear side, the brush head is prevented from coming off the neck body. In addition, when the brush head is slightly tilted about the front end of the head support shaft, both ends of the coming-off preventing piece come into contact with the rear surface of the support wall portion and slide on the rear surface of the support wall portion, whereby a load that causes the brush head to be tilted is received. In the present invention, the front end of the head support shaft is located to a further front side as compared to the front end of the head support shaft described in Patent Literature 1. Therefore, the angle of the contact direction of the coming-off preventing piece with respect to the rear surface of the support wall portion becomes smaller than the angle in the base where the front end of the head support shaft is located at the rear surface position of the planting base, and thus the frictional resistance is reduced accordingly, leading to reduction in power consumption. In addition, the head-side conversion portion is connected to a rear part of the fitting shaft portion, in the side close to the base portion of the neck body with respect to the coming-off preventing piece. Therefore, as compared to the case where the head-side conversion portion is connected to the coming-off preventing piece, the head portion can be downsized in the front-rear direction by an amount corresponding to the thickness of a connection part with the fitting shaft portion in the head-side conversion portion. Further, the distance between the distal end of the head support shaft and an acting point of power from the driving portion onto the brush head can be shortened by an amount corresponding to the thickness of the coming-off preventing piece. Therefore, when the brush head reciprocates rotationally by power from the power transmission portion, a moment acting on the brush head about the distal end of the head support shaft is reduced, so that vibration of the brush head due to the moment can be reduced and stability of action of the brush head can be improved. Furthermore, since vibration of the brush head is reduced, contact between the coming-off preventing piece and the support wall portion can be decreased, and the frictional resistance due to contact therebetween is reduced, whereby power consumption can be reduced.

10) The electric toothbrush according to the above 9), in which the head-side conversion portion includes a swing lever having a base portion that is rotatably supported by the neck, and a distal end that is connected to the rear part of the fitting shaft portion, in the side close to the base portion of the neck body with respect to the coming-off preventing piece. With the above configuration, the rotation angle of a reciprocating rotational motion of the brush head can be sufficiently ensured.

11) The electric toothbrush according to the above 10), in which a guide portion including a groove portion extending in a radial direction is provided at the rear part of the fitting shaft portion, in the side close to the base portion of the neck body with respect to the coming-off preventing piece, and the distal end of the swing lever has a connection pin movably fitted to the guide portion.

Advantageous Effects of the Invention

In the electric toothbrush according to the present invention, the front end of the head support shaft is located frontward of the rear surface of the planting base. Accordingly, the head portion provided at the distal end of the replaceable brush can be downsized in the front-rear direction, and the frictional resistance between the brush head and the neck body during brushing can be made as small as possible. In addition, since the power transmission portion is connected to a rear part of the fitting shaft portion, the head portion provided at the distal end of the replaceable brush can be downsized in the front-rear direction, and vibration in a reciprocating rotational motion of the brush head can be reduced. As described above, the head portion can be downsized in the front-rear direction, whereby operability of the head portion in an oral cavity can be improved, and thus, for example, cleaning performance of the electric toothbrush on the back side of molar teeth can be improved. In addition, the frictional resistance between the brush head and the neck body and vibration of the brush head can be reduced, whereby stability of action of the brush head can be improved and power consumption can be reduced.

BRIEF DESCRIPTION OF THE DRAWINGS

FIG. 6 shows, in (A) a front view of a lid member, and shows, in (B) a back view of a neck body from which the lid member is detached.

FIG. 10 shows, in (A) a perspective view of a brush head, a swing lever, and a connection bar when they are connected, and shows, in (B) an exploded perspective view of the brush head, the swing lever, and the connection bar.

DESCRIPTION OF EMBODIMENTS

Hereinafter, embodiments of the present invention will be described with reference to the drawings. In the present embodiment, the up-down direction, the front-rear direction, and the right-left direction are defined with respect to a state in which an electric toothbrush stands in the longitudinal direction such that the brush head side is directed upward and the bristle bundle planted side is directed frontward.

Figure 1:
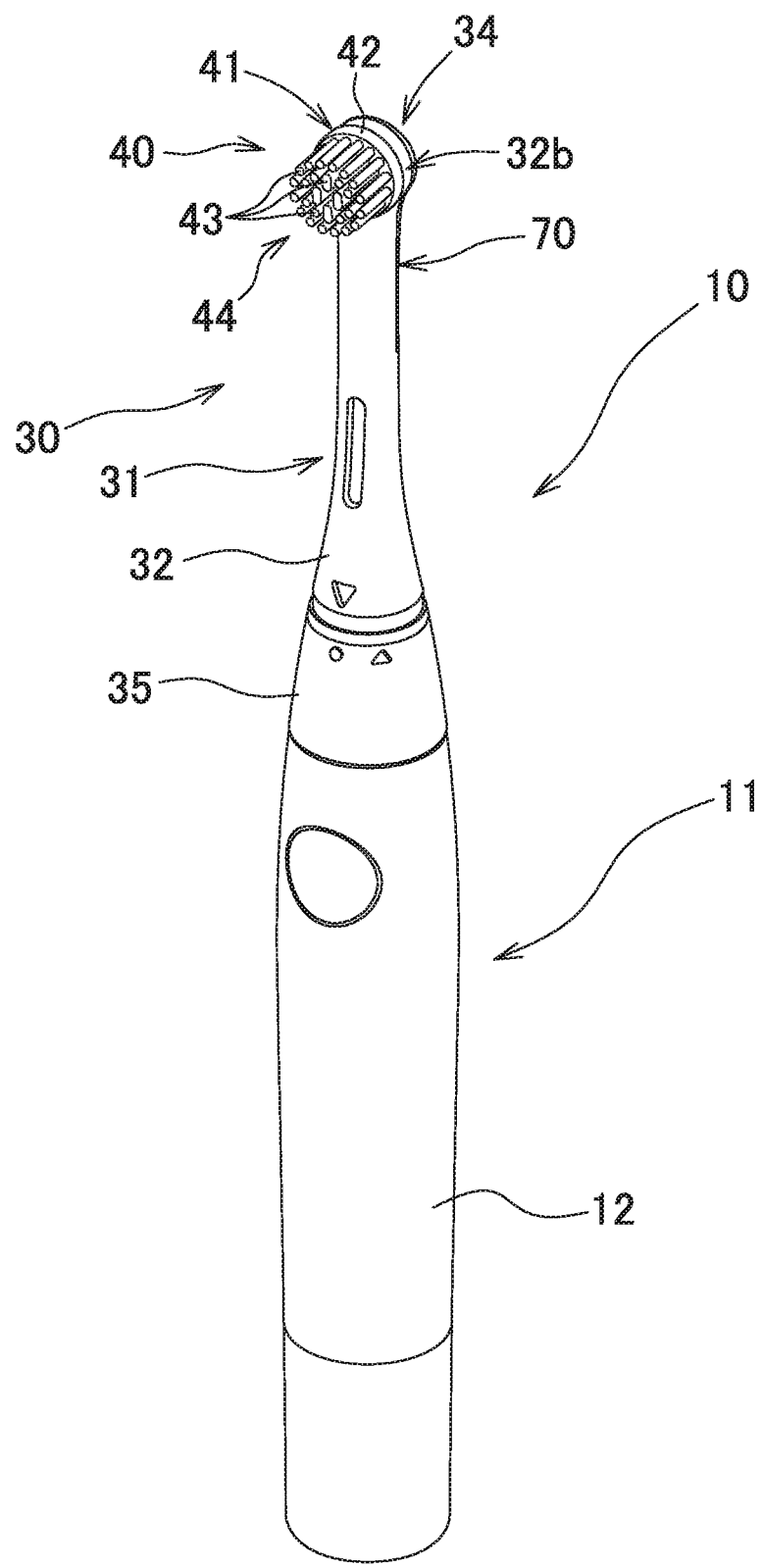
FIG. 1 is a perspective view of an electric toothbrush.
Figure 2:
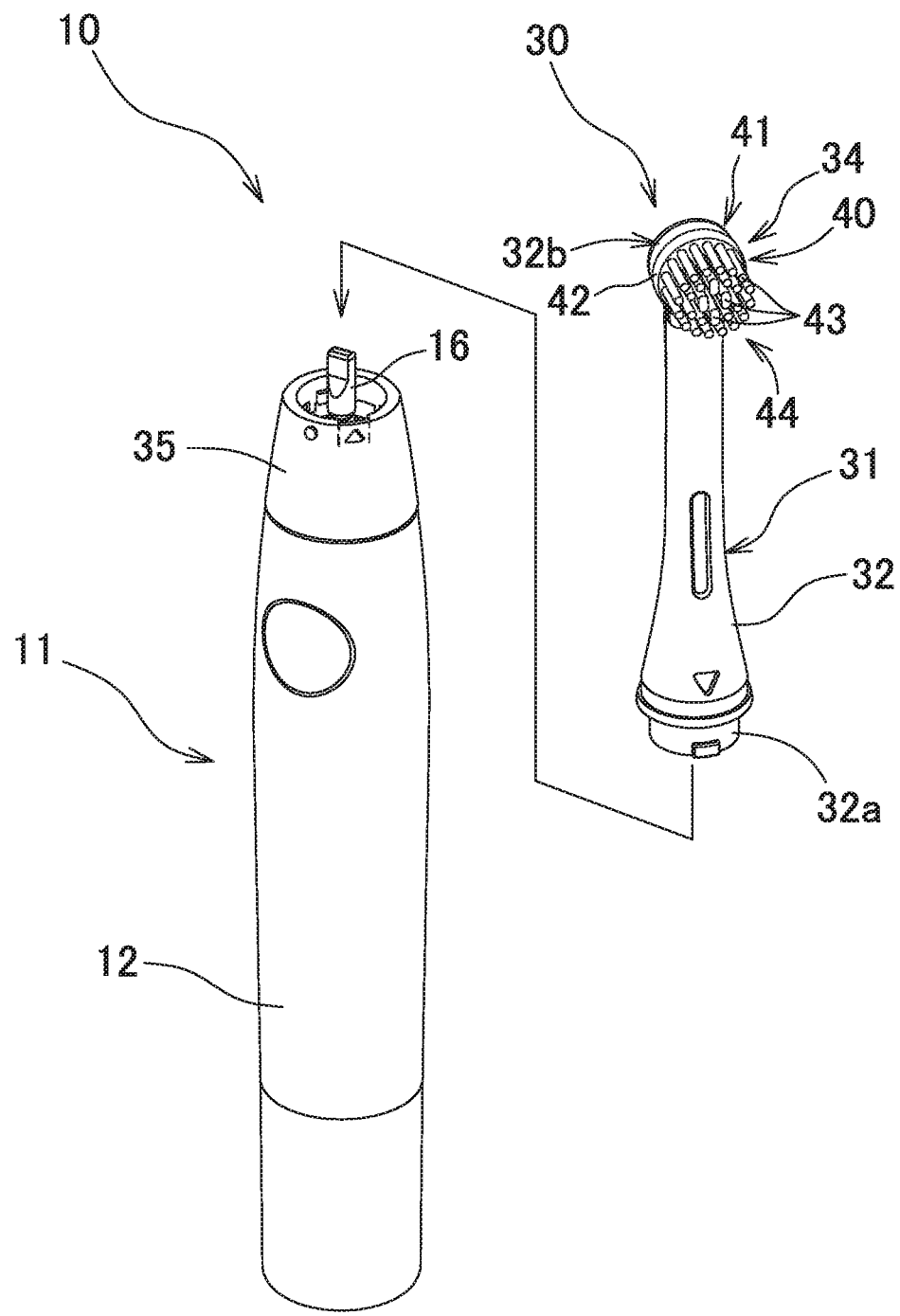
FIG. 2 is a perspective view of the electric toothbrush when a replaceable brush is detached.

As shown in FIG. 1 and FIG. 2, an electric toothbrush 10 includes a body device 11 which also serves as a handle, and a replaceable brush 30 detachably attached to the body device 11.

<<Body Device>>

Figure 3:
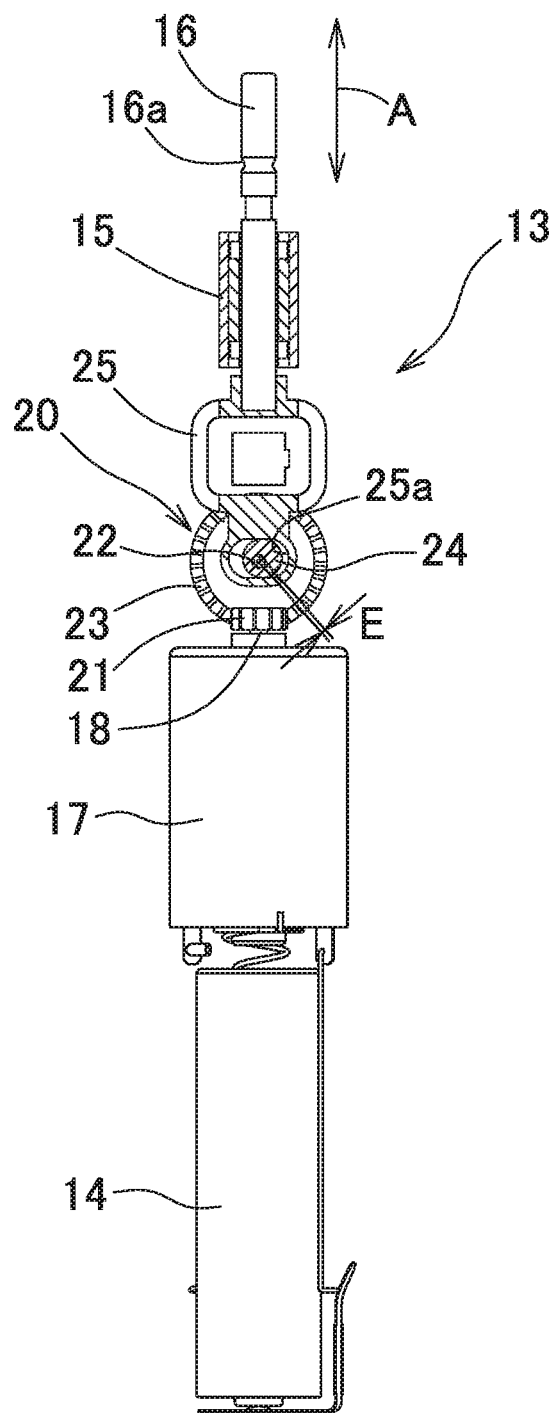
FIG. 3 is an explanatory diagram of a driving portion of the electric toothbrush.

As shown in FIG. 1 to FIG. 3, the body device 11 includes a body case 12 that can be gripped by a hand, a driving portion 13 provided inside an upper part of the body case 12, and a battery 14 which is a primary cell or a secondary cell and which is provided inside a lower part of the body case 12. In the case of using the primary cell as the battery 14, the battery 14 is to be replaceably mounted inside the body case 12, and in the case of using the secondary cell as the battery 14, an induction coil may be provided inside a lower end part of the body case 12, and the body device 11 is set on a charger, so as to generate an induction current in the induction coil, whereby the battery can be charged in a contactless manner.

<Driving Portion>

As shown in FIG. 3, the driving portion 13 includes an output shaft 16 provided movably in the up-down direction along a guide member 15, a motor 17 provided downward of the output shaft 16, and a body-side conversion portion 20 which is provided between the output shaft 16 and the motor 17, and converts a rotational motion of a rotation shaft 18 of the motor 17 to a reciprocating linear motion of the output shaft 16 in the up-down direction.

<Body-Side Conversion Portion>

The body-side conversion portion 20 will be described. A drive gear 21 is fixed to the rotation shaft 18 of the motor 17, a gear support shaft 22 formed in a direction perpendicular to the rotation shaft 18 is provided above the rotation shaft 18, and a ring gear 23 meshed with the drive gear 21 is supported by the gear support shaft 22. At the ring gear 23, a cam shaft 24 having a center at a position eccentric from the center of the gear support shaft 22 by a certain eccentricity distance E is formed in a protruding shape. A driven member 25 having an elongated hole 25a into which the cam shaft 24 is fitted is fixed to a lower end of the output shaft 16. When the rotation shaft 18 of the motor 17 rotates, the ring gear 23 is rotated via the drive gear 21, and the cam shaft 24 eccentrically rotates about the gear support shaft 22 within the elongated hole 25a of the driven member 25. Then, only an up-down-direction component of the rotation of the cam shaft 24 is transmitted to the driven member 25, so that the output shaft 16 performs a reciprocating linear motion in the up-down direction as indicated by arrow A in FIG. 3, with a stroke of two times an eccentricity distance E between the center of the cam shaft 24 and the center of the gear support shaft 22.

It is noted that any configuration that allows the output shaft 16 to linearly reciprocate may be employed for the body device 11. For example, as the driving portion 13, a linear-type driving portion may be employed in which a linear actuator having a coil and a permanent magnet is provided to apply an alternating current to the coil, thereby enabling the output shaft 16 to linearly reciprocate.

<<Replaceable Brush>>

Figure 4:
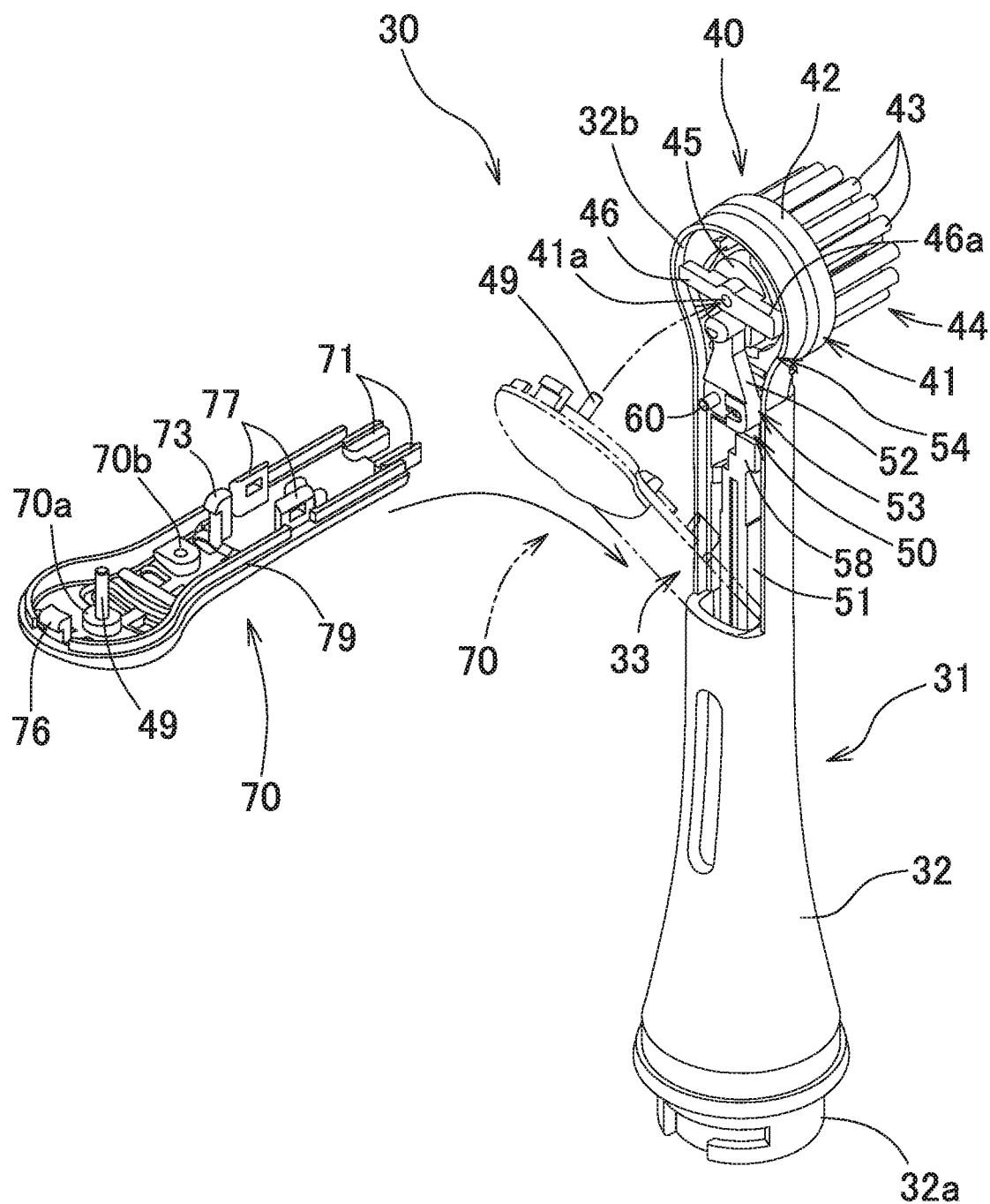
FIG. 4 is an exploded perspective view of the replaceable brush.
Figure 5:
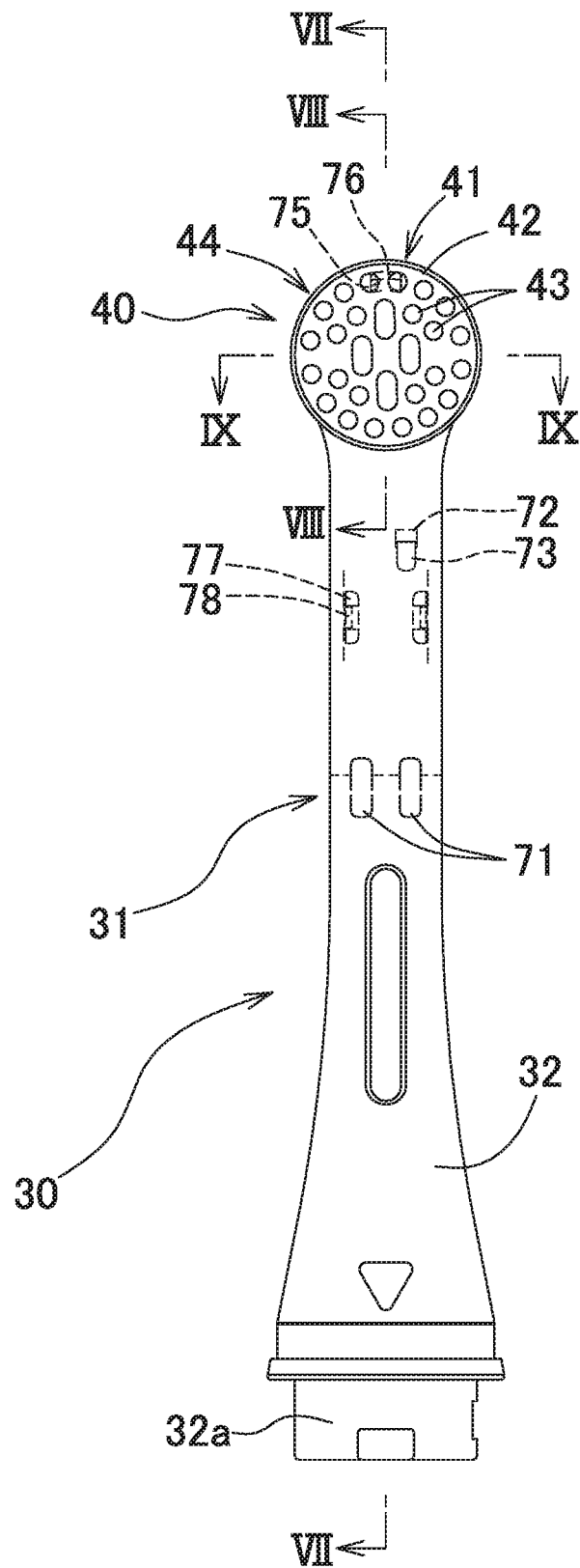
FIG. 5 is a front view of the replaceable brush.

As shown in FIG. 1, FIG. 2, and FIG. 4, the replaceable brush 30 includes a neck 31 extending upward from the body case 12, a brush head 40 provided at a distal end of the neck 31, and a head-side conversion portion 50 which converts reciprocating linear motion of the output shaft 16 of the driving portion 13 to reciprocating rotational motion of the brush head 40. It is noted that a power transmission portion is composed of the body-side conversion portion 20, the head-side conversion portion 50, and so on.

<Neck>

The neck 31 will be described. As shown in FIG. 4 to FIG. 7, the neck 31 includes a hollow cylindrical neck body 32 having an opening 33 provided at an upper part on the rear surface side (distal-end-side rear part), and a lid member 70 detachably attached to the neck body 32 so as to close the opening 33 of the neck body 32. The neck body 32 and the lid member 70 are formed as molded articles using a synthetic resin material.

Figure 7:
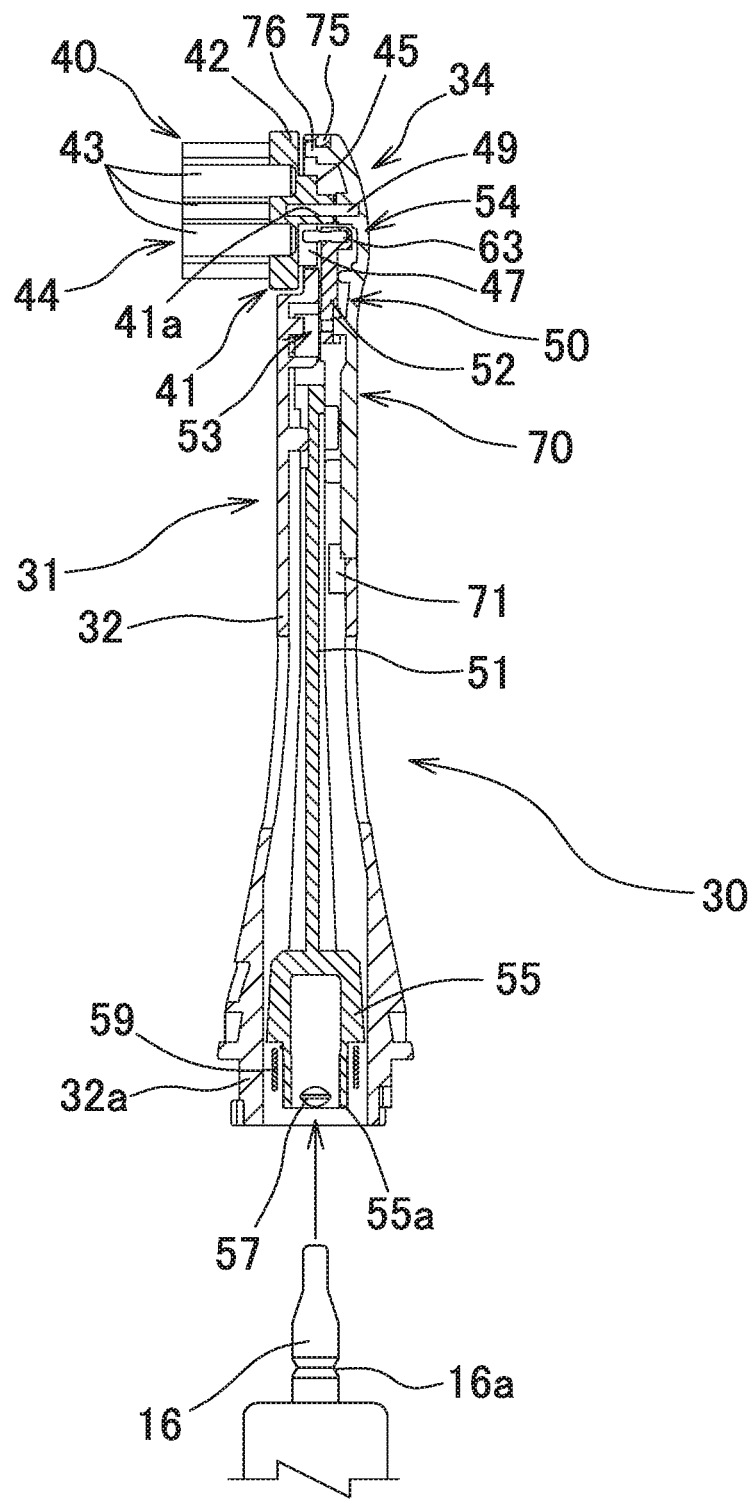
FIG. 7 is a sectional view along the line VII-VII in FIG. 5.

The replaceable brush 30 is assembled as follows. As shown in FIG. 4, FIG. 6, and FIG. 7, a pair of engagement pieces 71 formed at a lower end of the lid member 70 are obliquely inserted into the neck body 32, in a state in which the head-side conversion portion 50 and the brush head 40 are mounted to the neck body 32. Then, the lid member 70 is turned about the lower end of the lid member 70 toward the neck body 32 side, so that a first hook 73 is engaged with a first engagement portion 72, a third hook 78 is engaged with a third engagement portion 77, a second hook 76 is engaged with a second engagement portion 75, and rabbeting portions 79 are fitted to each other.

As shown in FIG. 2, an inner-fit cylinder portion 32a is formed at a lower end of the neck body 32, and a cover cylinder 35 is provided at an upper end of the body case 12. The inner-fit cylinder portion 32a is fitted into the cover cylinder 35, so that the neck 31 is attached to the body case 12 in a detachable manner and in a relatively unmovable manner in the axial direction of the output shaft 16.

<Brush Head>

As shown in FIG. 10, the brush head 40 includes a brush head body 41 rotatably provided at a distal end of the neck 31, and a brush portion 44 composed of a plurality of bristle bundles 43 planted in a planting base 42 of the brush head body 41.

The brush portion 44 has a known structure in which the bristle bundles 43 each formed by bundling a plurality of filaments made of a synthetic resin are planted and fixed to a plurality of planting holes 42a formed in the planting base 42. Although the bristle bundle 43 is illustrated as one lump in the drawing, the bristle bundle 43 is actually formed by bundling a plurality of filaments.

The brush head body 41 includes: the planting base 42 having a disk shape; a fitting shaft portion 45 provided at a center part on the rear surface of the planting base 42 so as to protrude rearward; a coming-off preventing piece 46 which is provided on the rear surface of the fitting shaft portion 45 substantially in the diameter direction so as to protrude rearward; and a second guide portion 47 which is formed from a groove portion extending in the radial direction of the fitting shaft portion 45 so as to be substantially perpendicular to the coming-off preventing piece 46. The brush head body 41 is formed as an integrated molded article using a synthetic resin material.

The structure for attaching the brush head body 41 to the neck 31 will be described. As shown in FIG. 4 to FIG. 9, a head support portion 32b located on the rear surface side of the brush head body 41 is provided at a distal end of the neck body 32, and on the front surface side of the head support portion 32b, a support wall portion 37 is formed at a position recessed rearward by an amount substantially corresponding to the thickness of the planting base 42. A through hole 37a through which the fitting shaft portion 45 is inserted in a loosely fitted manner is formed at a center part of the support wall portion 37, and a pair of cutouts 37b extending in the up-down direction from the through hole 37a are formed. Coming-off preventing portions 46a protruding outward in the radial direction of the fitting shaft portion 45 are formed at both ends of the coming-off preventing piece 46. The pair of coming-off preventing portions 46a are inserted through the pair of cutouts 37b and the fitting shaft portion 45 is mounted in a loosely fitted manner in the through hole 37a. In this state, the brush head body 41 is rotated by about 90°, thereby restricting the coming-off preventing portions 46a to move forward in a certain angle range, by the support wall portion 37, whereby the brush head body 41 is prevented from coming off the neck body 32, with being allowed to rotatably reciprocate relative to the neck body 32.

A bearing portion 70a is provided at an upper part of the lid member 70, so as to protrude frontward. A metallic head support shaft 49 extending frontward is fixed to the bearing portion 70a. A shaft hole 41a into which the head support shaft 49 is fitted is formed in the brush head body 41. Thus, the brush head body 41 is rotatably supported by the head support shaft 49. The coming-off preventing piece 46 is held between the support wall portion 37 and the bearing portion 70a with certain clearances therefrom, whereby the brush head body 41 is mounted to the neck 31 so that the brush head body 41 hardly moves in the axial direction of the head support shaft 49. It is noted that, in addition to the above-mentioned structure, an attachment structure by which the brush head body 41 is be held so as to be able to rotationally reciprocate relative to the neck 31 may be employed as the attachment structure for the brush head body 41.

Figure 8:
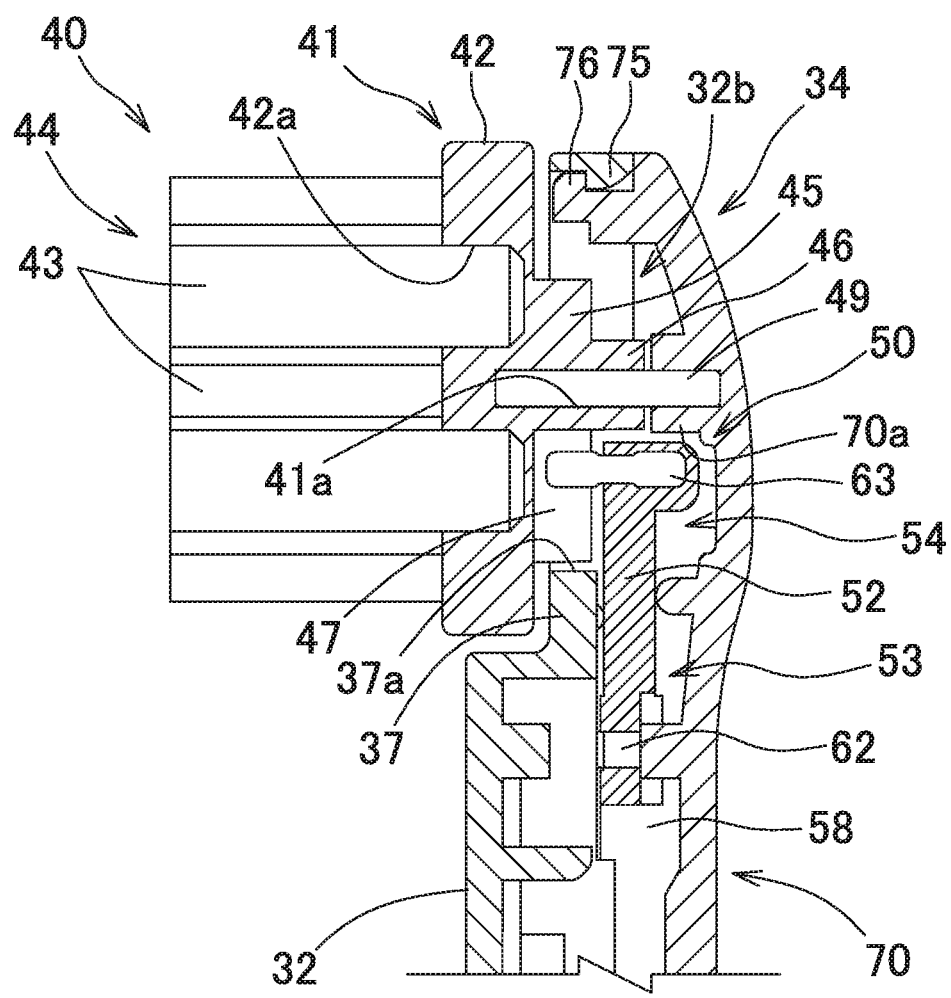
FIG. 8 is a sectional view along the line VIII-VIII in FIG. 5.
Figure 9:
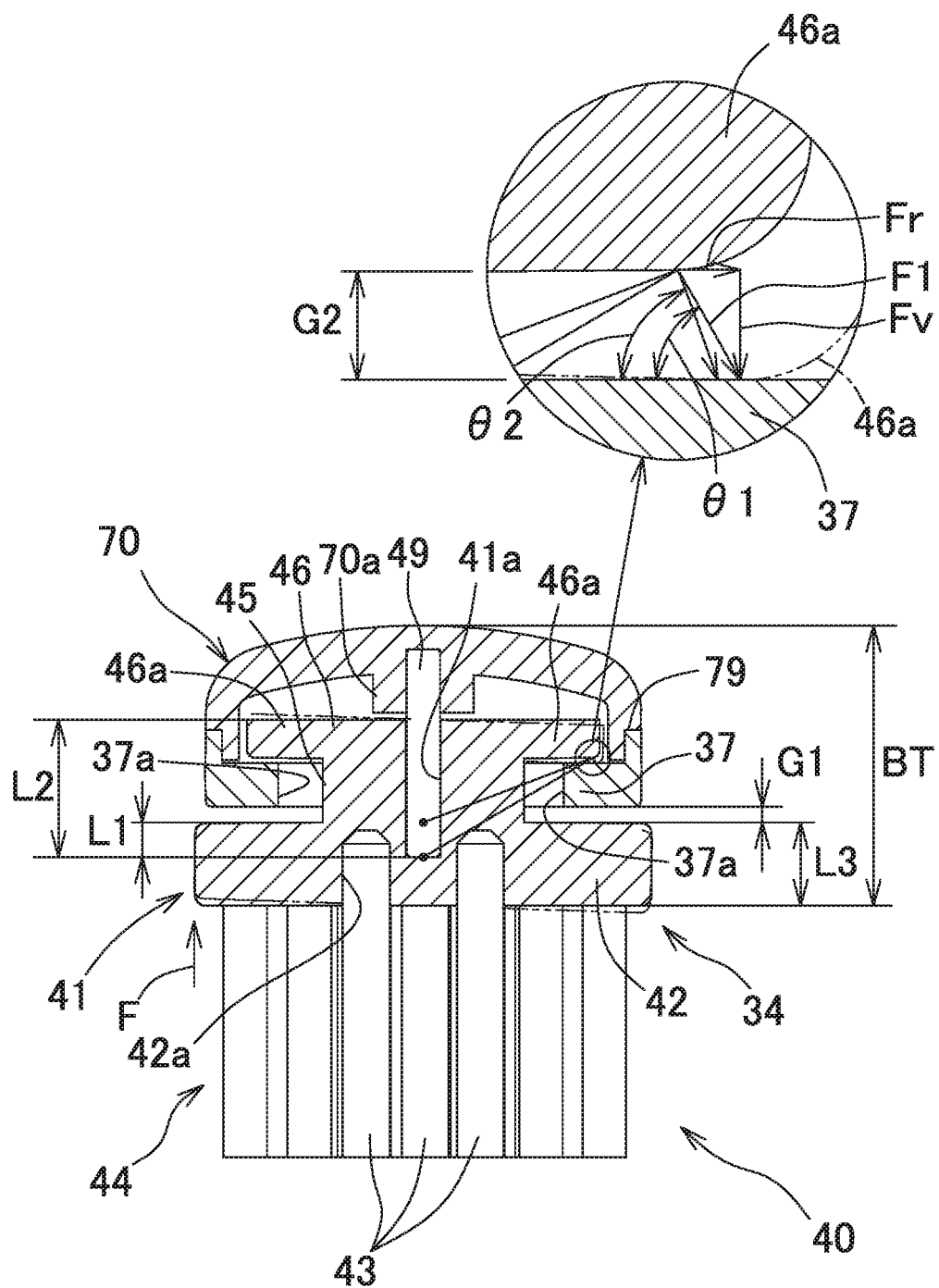
FIG. 9 shows a sectional view along the line IX-IX in FIG. 5, and a major part enlarged view thereof.

As shown in FIG. 8 and FIG. 9, in the planting base 42, no planting hole 42a is formed at a position where the shaft hole 41a is formed, and the front end of the head support shaft 49 is located frontward of the rear surface of the planting base 42. Here, the front end of the head support shaft 49 is preferably located frontward of the back ends of the planting holes 42a, and more preferably located frontward as much as possible within a range in which the front end of the head support shaft 49 does not penetrate through the planting base 42 to the outside. As described above, a distance L1 from the rear surface of the planting base 42 to the front end of the head support shaft 49 is set to be as long as possible. Accordingly, an insertion depth L2 of the head support shaft 49 into the brush head body 41 is sufficiently ensured, and a thickness BT of the head portion 34 that is the distal-end-side part of the replaceable brush 30, excluding the bristle bundles 43, is reduced, whereby the back side of molar teeth can be adequately cleaned.

In addition, in the case where the front end of the head support shaft 49 is located frontward of the rear surface of the planting base 42 as described above, the frictional resistance due to contact between the brush head body 41 and the neck body 32 when a brushing pressure acts obliquely rearward on the brush head 40 can be reduced as compared to the case where the front end of the head support shaft 49 is located rearward of the rear surface of the planting base 42. Specifically, when the brushing pressure acts obliquely rearward on the brush head 40, the brush head 40 is tilted about the front end of the head support shaft 49, so that an obliquely rearward load acting on the brush head 40 is received by the bearing portion 70a and the front surface of one of the coming-off preventing portions 46a comes into contact with the rear surface of the support wall portion 37. In response to the contact pressure at this time, a frictional resistance for stopping tilting of the brush head 40 occurs. However, if the front end of the head support shaft 49 is located frontward of the rear surface of the planting base 42, for example, a force F acts on an outer peripheral part of the planting base 42 in the brush head 40, as indicated by a virtual line in FIG. 9. This causes the brush head 40 to oscillate. In such a case, an angle θ1 defined by the contact direction of the coming-off preventing portion 46a with respect to the rear surface of the support wall portion 37 is smaller than an angle θ2 defined in the case where the front end of the head support shaft 49 is located at the rear surface position of the planting base 42. As a result, of resolved forces Fr and Fv of a force F1 that causes the brush head 40 to tilt, the resolved force Fv in the direction of pressing the rear surface of the support wall portion 37 is reduced, and thus the frictional resistance is reduced accordingly, whereby power consumption can be reduced.

Here, a thickness L3 of the planting base 42 is preferably set to 2 mm or more so as to obtain sufficient strength and stiffness, and is preferably set to 4 mm or less so that the thickness BT of the head portion 34 becomes as small as possible and operability of the head portion 34 in an oral cavity is improved.

It is preferable that the distance L1 from the rear surface of the planting base 42 to the front end of the head support shaft 49 is set to be as long as possible. However, if the distance L1 is extremely long, the head support shaft 49 penetrates through the planting base 42. Therefore, the distance L1 is preferably set so that the distance from the front surface of the planting base 42 to the front end of the head support shaft 49 (L3-L1) is not less than 0.2 mm and not greater than 3.9 mm. By setting the distance L3-L1 as described above, the strength of the planting base against penetration of the head support shaft 49 is sufficiently ensured, and the thickness of the head portion 34 is reduced, whereby operability of the head portion 34 in an oral cavity can be improved.

A maximum gap G1 between the planting base 42 and the support wall portion 37 under no load is preferably set to 0.2 mm or more so as to prevent frictional resistance increase caused by the contact of the planting base 42 having a larger diameter than the coming-off preventing piece 46 with the support wall portion 37, and is preferably set to 1.0 mm or less so that a lip, a tongue, or an oral cavity mucous membrane will not be pinched between the planting base 42 and the support wall portion 37.

A maximum gap G2 between the coming-off preventing piece 46 and the support wall portion 37 under no load is set to be smaller than the maximum gap G1. Accordingly, when an obliquely rearward load acts on the brush head 40 and the brush head 40 is tilted about the distal end of the head support shaft 49 during normal brushing operation, for example, one coming-off preventing portion 46a of the coming-off preventing piece 46 comes into contact with the support wall portion 37 earlier than the planting base 42, whereby a load in the tilting direction of the brush head 40 about the distal end of the head support shaft 49 can be received. Such a structure can prevent increase in frictional resistance, which is caused by the contact of the planting base 42 having a larger diameter than the coming-off preventing piece 46 with the support wall portion 37.

<Head-Side Conversion Portion>

As shown in FIG. 4, FIG. 6, and FIG. 11, the head-side conversion portion 50 includes: a connection bar 51 capable of linearly reciprocating together with the output shaft 16; a swing lever 52 that is located between the connection bar 51 and the brush head body 41 and has a base portion close to the connection bar 51, which is rotatably supported by the neck 31; a first conversion portion 53 which converts the reciprocating linear motion of the connection bar 51 to the reciprocating rotational motion of the swing lever 52; and a second conversion portion 54 which converts a reciprocating rotational motion of the swing lever 52 to a reciprocating rotational motion of the brush head body 41.

(Connection Bar)

The connection bar 51 will be described. The connection bar 51 extending from the lower end of the neck 31 toward the upper end thereof is mounted inside the neck 31 so as to be movable in the up-down direction, and a fitting cylinder portion 55 to which the output shaft 16 is detachably fitted is formed at the lower end of the connection bar 51. The lower half of the fitting cylinder portion 55 is divided into semi-cylindrical divided cylinders 55a with a pair of slits 56 extending in the up-down direction. Engagement protrusions 57 protruding inward are formed at the vicinity of the lower end of the inner surfaces of the divided cylinders 55a. A coil spring 59 that can energize the divided cylinders 55a in such directions as to approach each other is externally mounted to the fitting cylinder portion 55. When the upper end of the output shaft 16 is fitted into the fitting cylinder portion 55, the engagement protrusions 57 are engaged with an engagement groove 16a formed on the output shaft 16 by elasticity of the material of the divided cylinders 55a and an energizing force of the coil spring 59, whereby the connection bar 51 is connected to the output shaft 16 so as to be unmovable in the axial direction relative to the output shaft 16.

(Swing Lever)

A lever support shaft 60 extending rearward is fixed in the front wall portion of the neck body 32, at a right part slightly lower than the planting base 42, and a bearing portion 70b for holding the rear end of the lever support shaft 60 is provided to the lid member 70. The lever support shaft 60 is fixed so as to extend between the lid member 70 and the front wall portion of the neck body 32, and the swing lever 52 extending upward is rotatably supported at the base portion thereof, at a middle part of the lever support shaft 60.

(First Conversion Portion)

The first conversion portion 53 will be described. A connection portion 52a extending laterally is provided at the base portion of the swing lever 52, and a first guide portion 61 which is a thin elongated hole that is long in the right-left direction is formed at the base end of the connection portion 52a.

An offset portion 58 that is offset leftward is formed at the upper end of the connection bar 51, and a first connection pin 62 is fixed to an end portion of the offset portion 58, so as to be rotatably fitted to the first guide portion 61 and to be movable along the first guide portion 61. Accordingly, the connection bar 51 linearly reciprocates in the up-down direction, to cause the swing lever 52 to rotationally reciprocate about the lever support shaft 60.

(Second Conversion Portion)

The second conversion portion 54 will be described. The second guide portion 47 which is a groove portion extending downward in the radial direction, and opens at the lower end is formed at the fitting shaft portion 45. A second connection pin 63 is fixed at the distal end of the swing lever 52 and protrudes frontward, so as to be rotatably fitted to the second guide portion 47 and to be movable along the second guide portion 47. Accordingly, the swing lever 52 rotationally reciprocates about the lever support shaft 60, to cause the brush head 40 to rotationally reciprocate about the head support shaft 49.

The head support shaft 49, the lever support shaft 60, the first connection pin 62, and the second connection pin 63 are disposed in parallel to each other. However, they may be disposed with any combination with angles.

A maximum rotation angle θ3 of the brush head 40 about the head support shaft 49 can be set optionally. However, if the maximum rotation angle θ3 is extremely great, the structure of the head-side conversion portion 50 is complicated, whereas if the maximum rotation angle θ3 is extremely small, cleaning performance is reduced. Therefore, it is desirable that the maximum rotation angle θ3 is set within a range of 40° to 85°, and it is further desirable that the maximum rotation angle θ3 is set within a range of 45° to 80°.

Figure 11A:
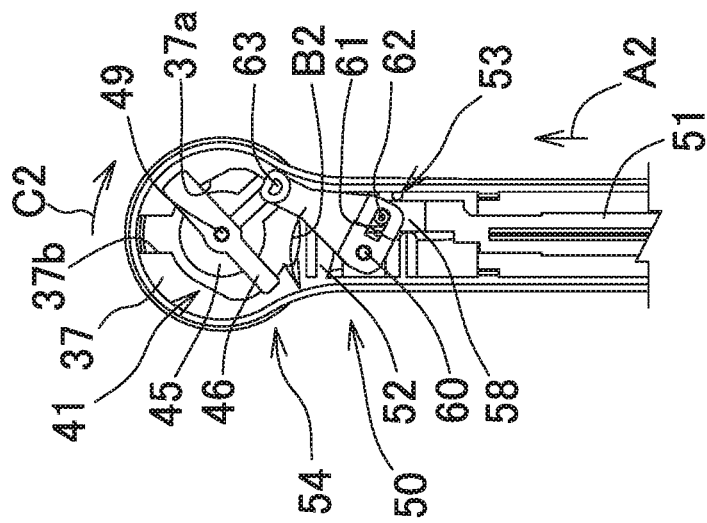
FIG. 11 illustrates, in (A), (B), and (C), actions of a head-side conversion portion.
Figure 11B:
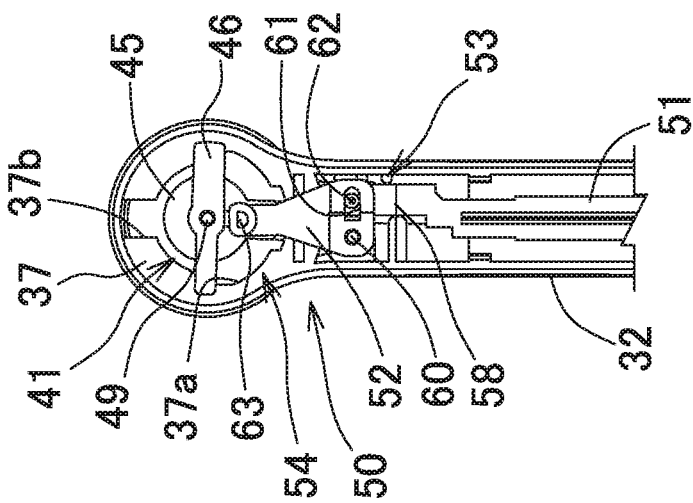
Figure 11C:
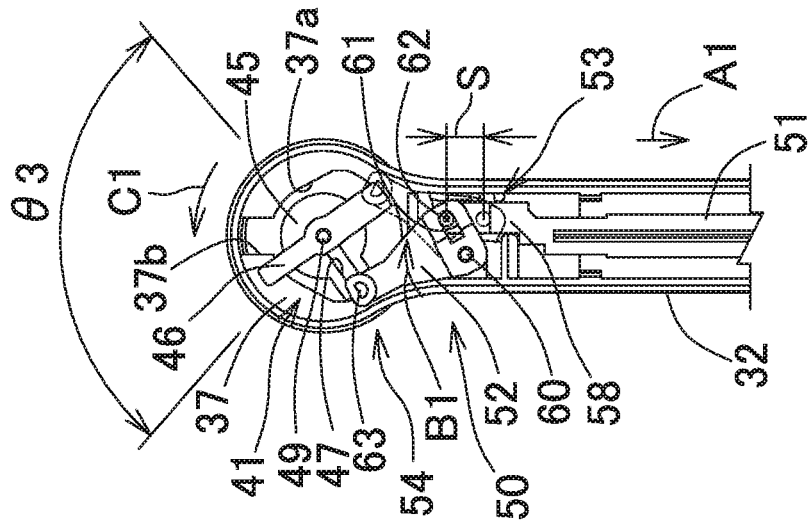

In the electric toothbrush 10, when the connection bar 51 moves down in the direction of arrow A1 from the upper limit position shown in FIG. 11(A) through the middle position shown in FIG. 11(B) to the lower limit position shown in FIG. 11(C), the swing lever 52 rotates in the direction of arrow B1 about the lever support shaft 60 via the first connection pin 62 and the first guide portion 61 of the first conversion portion 53, and the brush head 40 rotates in the direction of arrow C1 about the head support shaft 49 via the second connection pin 63 and the second guide portion 47 of the second conversion portion 54, so that the swing lever 52 and the brush head 40 rotate to the positions shown in FIG. 11(C). On the other hand, when the connection bar 51 moves up in the direction of arrow A2 from the lower limit position shown in FIG. 11(C) through the middle position shown in FIG. 11(B) to the upper limit position shown in FIG. 11(A), the swing lever 52 rotates in the direction of arrow B2 about the lever support shaft 60 via the first connection pin 62 and the first guide portion 61 of the first conversion portion 53, and the brush head 40 rotates in the direction of arrow C2 about the head support shaft 49 via the second connection pin 63 and the second guide portion 47 of the second conversion portion 54, so that the swing lever 52 and the brush head 40 rotate to the positions shown in FIG. 11(A). Thus, while the connection bar 51 linearly reciprocates in the up-down direction, the swing lever 52 rotationally reciprocates by a certain angle in the right-left direction about the lever support shaft 60, and the brush head 40 performs a reciprocating rotational motion by a certain angle about the head support shaft 49. In this way, the reciprocating linear motion of the connection bar 51 is converted to the reciprocating rotational motion of the brush head 40, by the head-side conversion portion 50 with the swing lever 52. Therefore, while the maximum rotation angle θ3 of the brush head 40 is sufficiently ensured as in a conventional electric toothbrush, a stroke S of the reciprocating linear motion of the connection bar 51 and the output shaft 16 can be reduced.

Thus, while the maximum rotation angle θ3 of the brush head 40 is sufficiently ensured and the cleaning performance is sufficiently ensured, the stroke S of the reciprocating linear motion of the connection bar 51 and the output shaft 16 is reduced, thereby reducing the kinetic energy for causing the connection bar 51 and the output shaft 16 to linearly reciprocate. In addition, friction energy between the neck body 32, and the connection bar 51 and the output shaft 16, is reduced, thereby reducing the power consumption of the electric toothbrush 10.

Also, if a known replaceable brush 30 without having the head-side conversion portion 50 is attached to the output shaft 16, the brush head 40 can reciprocate linearly together with the output shaft 16. Thus, the electric toothbrush 10 can be switched between a rotation type and a slide type by replacing the replaceable brush 30.

Since the second guide portion 47 that is a groove is provided at the fitting shaft portion 45 and the second connection pin 63 is fitted to the second guide portion 47, the distal end of the swing lever 52 and the coming-off preventing portions 46a can be located at the same position in the axial direction of the brush head 40. In addition, since the distal end of the head support shaft 49 is located frontward of the rear surface of the planting base 42, the thickness BT of the head portion 34 can be reduced in the front-rear direction by 1 mm to 4 mm as compared to the head portion having a structure as described in, for example, Patent Literature 1. Thus, since the thickness BT of the head portion 34 can be reduced, the operability of the head portion 34 in an oral cavity can be improved, so that the cleaning performance of the electric toothbrush on the back side of molar teeth can be improved, for example.

The distal end of the head support shaft 49 is located frontward of the rear surface of the planting base 42. Accordingly, even in the case where, for example, an obliquely rearward load acts on the brush head 40 during brushing to cause the brush head 40 to be tilted about the distal end of the head support shaft 49, the frictional resistance between the support wall portion 37 and the coming-off preventing portion 46a can be reduced, whereby power consumption of the electric toothbrush 10 can be reduced.

The fitting part between the second guide portion 47 and the second connection pin 63 serves as a connection portion between the swing lever 52 and the fitting shaft portion 45. Such a fitting part is located close to the distal end side of the head support shaft 49 by an amount corresponding to the thickness of the coming-off preventing piece 46. Accordingly, a moment in power transmission to the brush head 40 about the head support shaft 49 is reduced, so that vibration of the brush head 40 during operation can be reduced, and contact between the coming-off preventing piece 46 and the support wall portion 37 can be decreased to reduce the frictional resistance due to contact therebetween, whereby power consumption can be reduced.

As described above, in the electric toothbrush 10, the head portion 34 can be downsized in the front-rear direction, whereby the operability of the head portion 34 in an oral cavity can be improved. Thus, the cleaning operation on the back side of molar teeth can be improved, for example. In addition, the frictional resistance between the brush head 40 and the neck body 32 and vibration of the brush head 40 can be reduced, whereby the stability of action of the brush head 40 can be improved and the power consumption can be reduced.

For the body device 11, a configuration in which the output shaft 16 rotates, rotationally reciprocates, or swing can be employed in addition to a configuration in which the output shaft 16 linearly reciprocates. Furthermore, for the head-side conversion portion 50, any configuration by which a motion of the output shaft 16 such as reciprocating linear motion, a rotational motion, reciprocating-rotational motion, or swing motion, is converted to reciprocating rotational motion of the brush head 40 about the head support shaft 49, can be employed, as long as the position of the distal end of the head support shaft 49 is located frontward of the rear surface of the planting base 42.

Next, an evaluation test for the replaceable brush 30 in which the head support shaft 49 protrudes frontward of the rear surface of the planting base 42 will be described.

Figure 12:
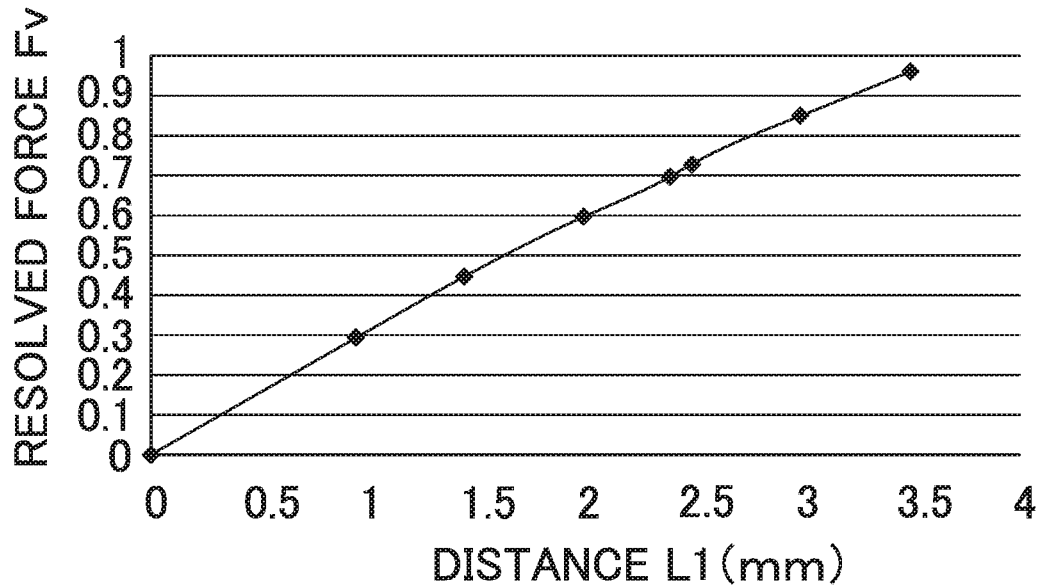
FIG. 12 is a graph showing the relationship between a distance L1 and a resolved force Fv.
Figure 13:
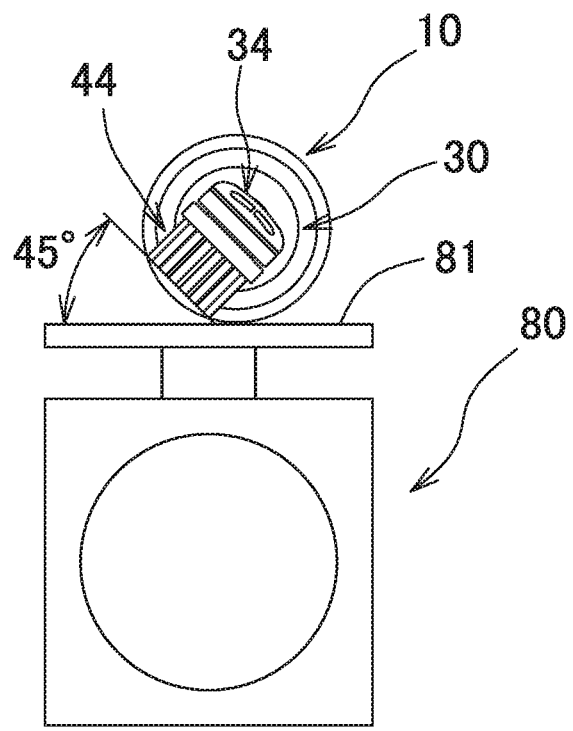
FIG. 13 illustrates a method for measuring power consumption.

First, theoretical values were calculated regarding the relationship between the distance L1 and the resolved force Fr, when the force F was applied to an outer peripheral portion of the planting base 42, as shown in FIG. 9. The distance L1 is defined from the rear surface of the planting base 42 to the distal end of the head support shaft 49. The resolved force Fr is directed outward in the radial direction, and contained in the force F1 of the coming-off preventing portion 46a pressing the support wall portion 37. The result is shown in FIG. 12. It is noted that the resolved force Fv was calculated with a definition that the resolved force Fv when the distal end of the head support shaft 49 was located at the rear surface of the planting base 42 was 0 and the resolved force Fv when the distal end of the head support shaft 49 was located at the front surface of the planting base 42 was 1.

As shown in FIG. 12, the resolved force Fr increases, as the distance L1 increases. Thus, the resolved force Fv acting when the rear surface of the support wall portion 37 is vertically pressed is reduced and the frictional resistance is reduced, whereby power consumption can be reduced.

Next, as shown in FIG. 12, the electric toothbrush 10 was located above a pan scale 80, in such a manner that the brush portion 44 of the electric toothbrush 10 came into contact with a pan 81 of the pan scale 80 at an angle of 45°, and then the electric toothbrush 10 was driven and moved down. Then, current consumption in the electric toothbrush 10 was measured for each of the cases: where the brush portion 44 was pressed to the pan 81 at a load of 100 g; where the brush portion 44 was pressed to the pan 81 at a load of 150 g; and where the brush portion 44 was pressed to the pan 81 at a load of 200 g. The result is shown in Table 1.

TABLE 1

| α (mm) | β (mm) | Z (mm) | Current consumption (A) | | |
|---|---|---|---|---|---|
| | | | 100 (gf) | 150 (gf) | 200 (gf) |
| 2.5 | 0 | 0.2 | 0.49 | 0.54 | 0.57 |
| 2.5 | 0.2 | | | | |
| 2.5 | 0.5 | | | | |
| 2.5 | 1 | | | | |
| 2.5 | 2 | | 0.49 | 0.54 | 0.56 |
| 2.5 | 0 | 0.5 | 0.48 | 0.51 | 0.54 |
| 2.5 | 0.2 | | | | |
| 2.5 | 0.5 | | | | |
| 2.5 | 1 | | 0.47 | 0.51 | 0.52 |
| 2.5 | 2 | | 0.46 | 0.48 | 0.48 |
| 2.5 | 0 | 1 | 0.48 | 0.52 | 0.54 |
| 2.5 | 0.2 | | | | |
| 2.5 | 0.5 | | | | |
| 2.5 | 1 | | | | |
| 2.5 | 2 | | 0.47 | 0.51 | 0.52 |

As shown in Table 1, there is a tendency that power consumption decreases as the distance L1 increases.

While the invention has been described with reference the above embodiment, the invention is not limited to the above embodiment at all, and it should be understood that the configuration thereof may be modified without departing from the scope of the invention.

DESCRIPTION OF THE REFERENCE CHARACTERS 10 electric toothbrush
11 body device
12 body case
13 driving portion
14 battery
15 guide member
16 output shaft
16a engagement groove
17 motor
18 rotation shaft
20 body-side conversion portion
21 drive gear
22 gear support shaft
23 ring gear
24 cam shaft
25 driven member
25a elongated hole
30 replaceable brush
31 neck
32 neck body
32a inner-fit cylinder portion
32b head support portion
33 opening
34 head portion
35 cover cylinder
37 support wall portion
37a through hole
37b cutout
40 brush head
41 brush head body
41a shaft hole
42 planting base
42a planting hole
43 bristle bundle
44 brush portion
45 fitting shaft portion
46 coming-off preventing piece
46a coming-off preventing portion
47 second guide portion
49 head support shaft
50 head-side conversion portion
51 connection bar
52 swing lever
52a connection portion
53 first conversion portion
54 second conversion portion
55 fitting cylinder portion
55a divided cylinder
56 slit
57 engagement protrusion
58 offset portion
59 coil spring
60 lever support shaft
61 first guide portion
62 first connection pin
63 second connection pin
70 lid member
21
70a bearing portion
70b bearing portion
71 engagement piece
72 first engagement portion
72b operation surface
73 first hook
73a hook portion
73b operation surface
74 drip hole
75 second engagement portion
76 second hook
77 third engagement portion
78 third hook
79 rabbeting portion
80 pan scale
81 pan

The invention claimed is:

1. An electric toothbrush comprising:
a driving portion mounted inside a body case;
a replaceable brush extending upward from the body case;
a brush head provided on a front side of a distal end of a neck of the replaceable brush; and
a power transmission portion configured to transmit power from the driving portion to the brush head so that the brush head rotationally reciprocates, wherein
the brush head includes a brush head body that has a planting base provided with a plurality of planting holes, and a fitting shaft portion protruding rearward from the planting base and penetrating through a support wall portion that is formed on aside close to a rear surface of the planting base in the neck, a shaft hole is formed at a rotation center of the brush head body so as to extend frontward from a rear surface of the brush head body,
the neck is provided with a head support shaft which is fitted to the shaft hole so as to rotatably support the brush head,
the head support shaft has a front end that is located frontward of the back ends of the plurality of planting holes and the head support shaft extends in a direction parallel to the direction along which the plurality of planting holes extend, the power transmission portion is connected to a rear part of the fitting shaft portion, and a coming-off preventing piece is provided in a diameter direction of the fitting shaft portion at a rear end thereof, the coming-off preventing piece having both ends protruding outward from the fitting shaft portion so that frontward movement of the coming-off preventing piece is blocked by the support wall portion, thereby preventing the brush head body from coming off.

2. The electric toothbrush according to claim 1, wherein the front end of the head support shaft is located frontward of back ends of the planting holes, and no planting hole is formed at a rotation center of the planting base.

3. The electric toothbrush according to claim 1, wherein a gap between the planting base and the support wall portion is set to 0.2 mm to 1.0 mm.

4. The electric toothbrush according to claim 1, wherein a thickness of the planting base is set to 2 mm to 4 mm.

5. The electric toothbrush according to claim 1, wherein the distance from the front surface of the planting base to the front end of the head support shaft is set to 0.2 mm to 3.9 mm.

6. The electric toothbrush according to claim 1, wherein the neck includes a neck body having an opening at a rear part of the neck body in a side close to a distal end of the neck body, and a lid member attached to the neck body so as to close the opening, and the head support shaft is fixed so as to protrude from on the lid member.

7. The electric toothbrush according to claim 1, wherein the power transmission portion includes a head-side conversion portion configured to convert reciprocating linear motion of an output shaft of the driving portion to reciprocating rotational motion of the brush head.

8. The electric toothbrush according to claim 7, wherein the head-side conversion portion includes: a connection bar capable of linearly reciprocating together with the output shaft; a swing lever which is located between the connection bar and the brush head body, and has a base portion on a side close to the connection bar is rotatably supported by the neck; a first conversion portion which converts reciprocating linear motion of the connection bar to reciprocating rotational motion of the swing lever; and a second conversion portion which converts the reciprocating rotational motion of the swing lever to reciprocating rotational motion of the brush head body.

9. The electric toothbrush according to claim 7, wherein the head-side conversion portion is connected to a rear part of the fitting shaft portion, in a side close to a base portion of the neck body with respect to the coming-off preventing piece.

10. The electric toothbrush according to claim 9, wherein the head-side conversion portion includes a swing lever having a base portion that is rotatably supported by the neck, and a distal end that is connected to the rear part of the fitting shaft portion, in the side close to the base portion of the neck body with respect to the coming-off preventing piece.

11. The electric toothbrush according to claim 10, wherein a guide portion including a groove portion extending in a radial direction is provided at the rear part of the fitting shaft portion, in the side close to the base portion of the neck body with respect to the coming-off preventing piece, and the distal end of the swing lever has a connection pin movably fitted to the guide portion.

* * * * *